Figure 1:
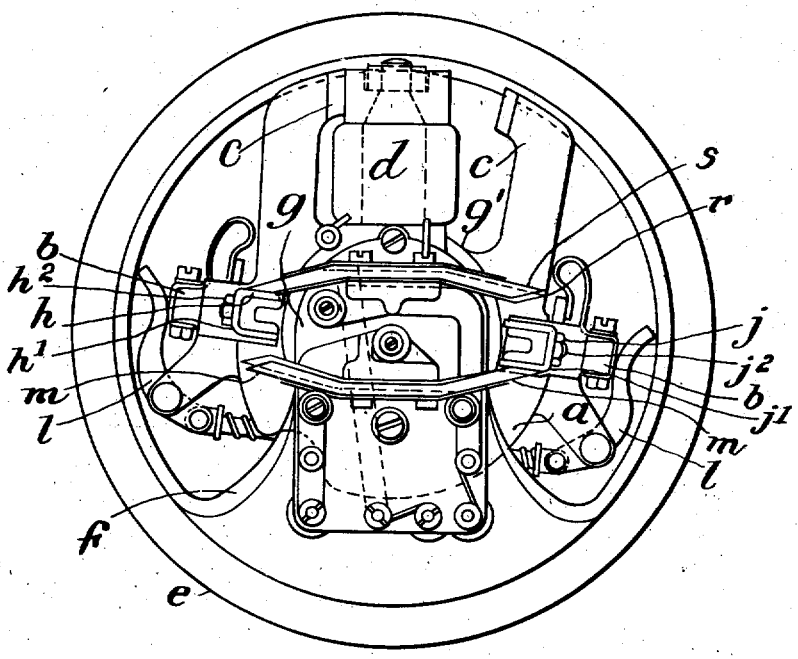

A. H. DARKER.

ELECTRICAL INSTALLATION FOR LIGHTING, HEATING, AND VENTILATING RAILWAY CARRIAGES AND FOR SIMILAR PURPOSES.

APPLICATION FILED JAN. 5, 1916.

Reissued Mar. 20, 1917.

14,274.

4 SHEETS—SHEET 1.

Witness.

Julian H. Kendig Jr.

Inventor

Alfred H. Darker by Synnestvedt & Bradley, Lechner & Fraker

Attorneys

A. H. DARKER.

ELECTRICAL INSTALLATION FOR LIGHTING, HEATING, AND VENTILATING RAILWAY CARRIAGES AND FOR SIMILAR PURPOSES.

APPLICATION FILED JAN. 5, 1916.

Reissued Mar. 20, 1917. 14,274.

4 SHEETS—SHEET 2.

Witness.
Julian H. Kendig.

Inventor
Alfred H. Darker
by
Symmes Redt Bradley Lechner & Fox
Attorneys.

A. H. DARKER.

ELECTRICAL INSTALLATION FOR LIGHTING, HEATING, AND VENTILATING RAILWAY CARRIAGES AND FOR SIMILAR PURPOSES.

APPLICATION FILED JAN. 5, 1916.

Reissued Mar. 20, 1917.

14,274.

4 SHEETS—SHEET 3.

Witness.
Julian H. Kendig.

Inventor.
Alfred H. Darker
by Lynnestredt & Bradley, Lechner & Fraker
Attorneys.

A. H. DARKER.

ELECTRICAL INSTALLATION FOR LIGHTING, HEATING, AND VENTILATING RAILWAY CARRIAGES AND FOR SIMILAR PURPOSES.

APPLICATION FILED JAN. 5, 1916.

Reissued Mar. 20, 1917.

14,274.

4 SHEETS—SHEET 4.

Witness
Julian H. Kendig

Inventor
Alfred H. Darker
by Hynnestrid & Bradlaf Schmitt & Fowler
Attorneys.

UNITED STATES PATENT OFFICE.

ALFRED HENRY DARKER, OF BLACKHEATH, ENGLAND, ASSIGNOR TO J. STONE & COMPANY, LTD., OF LONDON, ENGLAND.

ELECTRICAL INSTALLATION FOR LIGHTING, HEATING, AND VENTILATING RAILWAY-CARRIAGES AND FOR SIMILAR PURPOSES.

14,274. Specification of Reissued Letters Patent. Reissued Mar. 20, 1917.

Original No. 1,131,914, dated March 16, 1915, Serial No. 729,581, filed November 5, 1912. Application for reissue filed January 5, 1916. Serial No. 70,542.

*To all whom it may concern:*

Be it known that I, ALFRED HENRY DARKER, a subject of the King of Great Britain, and residing at Heath View, Montpelier Row, Blackheath, in the county of Kent, England, have invented new and useful Improvements in and Relating to Electrical Installations for Lighting, Heating, and Ventilating Railway-Carriages and for Similar Purposes, of which the following is a specification.

This invention comprises improvements in and relating to electrical installations for lighting, heating and ventilating railway carriages and for similar purposes and more particularly concerns those installations or systems wherein a dynamo driven from the axle of a vehicle is fitted with a rocking reversing switch which moves to one position or the other, according to the direction of rotation of the dynamo spindle, for the purpose of maintaining constant polarity at the terminals of the dynamo. In such systems it is usual to employ either a governor which closes the main switch when the armature has attained a sufficient speed, or an electro-magnet or solenoid which closes the main switch when the speed is sufficient for producing a predetermined terminal voltage.

It is preferred to employ a shunt wound dynamo fitted with a demagnetizing series winding which can be connected in a circuit or cut out, or short-circuited, at will. When the series winding is not active, the dynamo runs as an ordinary shunt-wound machine and the slipping of the driving belt is relied upon for giving a certain amount of regulation of the output. By connecting the series demagnetizing winding in circuit and by shifting the brushes so as to give them a certain lead the dynamo is self-regulating and may be driven by a tight belt or by a positive gearing, for, not only does the series winding have an increasing demagnetizing effect as the speed increases, but certain of the armature windings, owing to the lead which has been given to the brushes, assist the series winding in reducing the strength of the field produced by the shunt winding.

For closing the main circuit when the armature reaches a certain speed and a certain terminal voltage is produced, an electro-magnet or solenoid may be employed which is compound wound with a shunt and series winding. Thus when the shunt winding is sufficiently energized it closes the main switch, whereupon the circuit is closed through the series winding and the latter assists the shunt winding in holding the main switch tightly closed. Upon the armature speed falling, the switch arm may be pulled off against the attraction of the weakened compound wound magnet or solenoid by a spring, or by a weight carried by the switch lever.

Now in practice, if the main switch be closed while the dynamo is stationary or while the dynamo is being driven at a speed lower than the speed at which the main switch should be closed, much damage may be done to the dynamo, for current from the batteries will flow through the dynamo in the direction for running the dynamo as a motor, but inasmuch as the dynamo is prevented from so running by its driving belt or gear, it becomes overheated and the cells of the battery suffer owing to the excessive rate of discharge. Such ill-timed closing of the main switch may be due to a person meddling therewith, or it may be due to a blow or concussion, or it may be due to a defect, or to sticking of the armature or core of the switch.

In order to obviate the danger indicated above, the rocking reversing switch is so constructed and arranged that its initial movement in one direction or the other, under the influence of the frictional engagement of the brushes with the commutator, effects only the closing of the circuit of the shunt field winding and a further movement has to be given to the rocking switch in order to connect the dynamo with the cells. This further movement is produced by electromagnetic means, as for example by means of an electro-magnet fixed on a suitable framing and constructed and arranged so as to attract either one of two pieces of iron or armatures carried by the brush rocker. The winding of this magnet is preferably in the circuit of the shunt field winding.

These improvements also comprise arrangements for permitting of the maintenance of residual magnetism of the field magnets of a dynamo fitted as aforesaid, as well as arrangements for preventing overcharging of the battery or batteries in the external circuit. Furthermore, advantageous arrangements for changing over the batteries, when two or more batteries are employed, and for controlling the opening and closing of the main or working circuit are also provided according to this invention.

In order to enable the invention to be readily understood, reference is made to the accompanying drawings, in which:—

Figure 2:
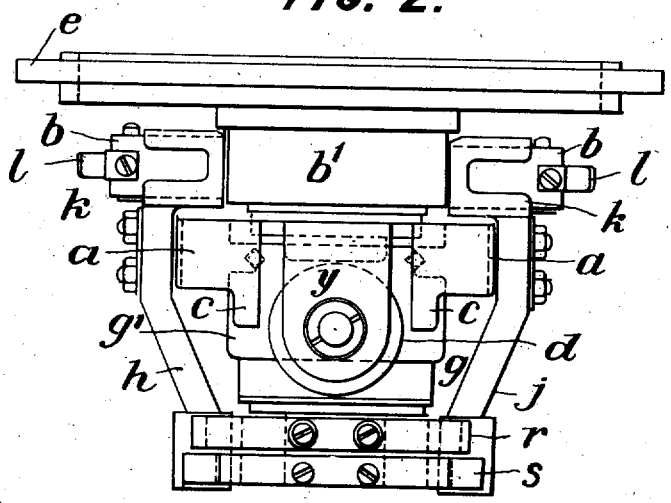
Figure 3:
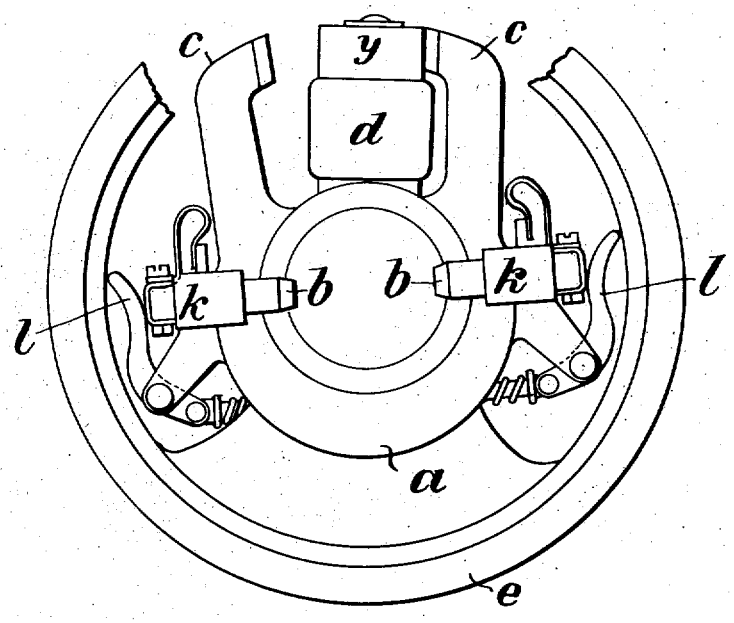
Figure 4:
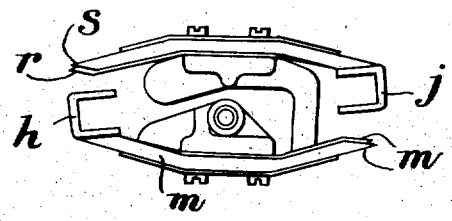
Figure 5:
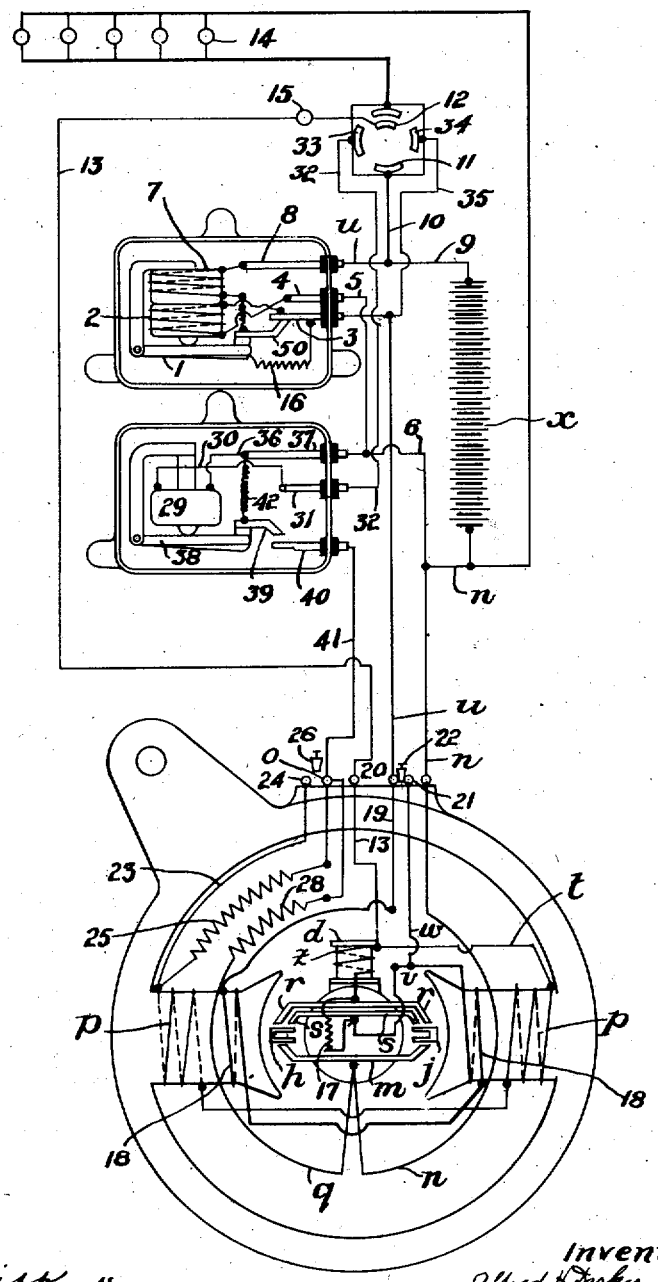
Figure 6:
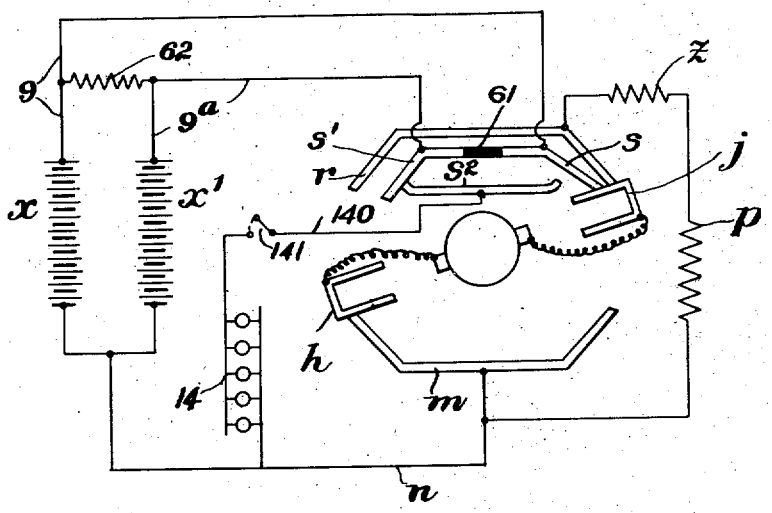
Figure 7:
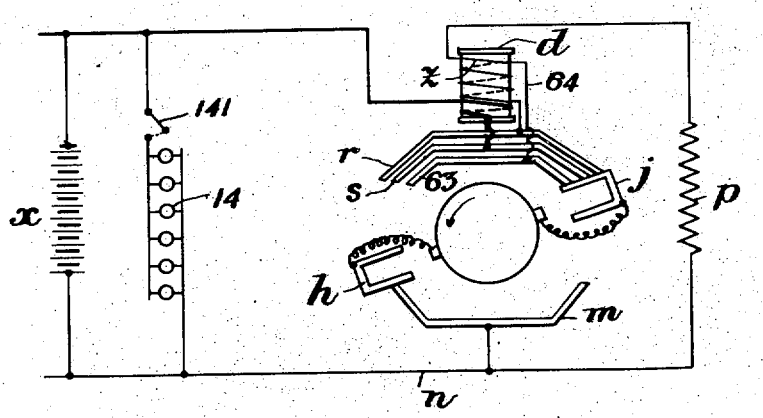

Figure 1 is an elevation of the improved rocking switch arrangement as seen from the end of the armature spindle. Fig. 2 is a plan of Fig. 1. Fig. 3 is an elevation of the arrangement shown in Fig. 1 but as seen from the opposite end of the spindle, the arrangement being shown removed from the spindle. Fig. 4 is a detail view of the rocking switch parts. Fig. 5 is a diagram showing the application of a dynamo fitted with the improved rocking switch to a single battery system suitable for a lighting, heating or ventilating installation on a railway vehicle. Fig. 6 is a diagram explanatory of a modified arrangement in a double battery system. Fig. 7 is a diagram illustrating a modification of the rocking switch.

In the arrangement illustrated by Figs. 1 to 4 *a* is a ring for carrying the dynamo brushes *b* which ring is revolubly mounted upon an end framing, or bearing, or upon the armature spindle. This ring *a* carries two projecting pieces of iron *c* situated a short distance apart which act as armatures for an electro-magnet *d* fixed upon the bearing or mounting comprising a ring frame *e* adapted to be fixed to the dynamo and having an axially directed bracket or extension *f* Fig. 1, terminating in a vertical support *g*. This support carries the bearing *g'* of the armature spindle upon which bearing a ball race is formed for receiving a circular series of balls upon which the ring *a* rocks as seen in Fig. 2. The ring *a* further supports at diametrically opposite points, axially directed projections or bars *h j* on the ends of which are mounted respective brushes *b*. These bars are suitably fixed in recesses in the ring *a* and insulated therefrom and the brush holders *k* are carried upon the ends of these bars, spring pressed levers *l* being provided for pressing the brushes *b* into contact with the commutator *b'*, Fig. 2, in the known manner. On one side of the diameter which passes through the projections or bars *h j* aforesaid, there is fixed a pair of switch blades or contact brushes *m* which are so arranged that each member of the pair lies in the path of a respective projection or bar *h* or *j*. This pair of contacts or blades *m* is connected with the negative main *n*, Fig. 5, and with one terminal *o* of the shunt winding *p* by the connection *q*. On the other side of the said diameter there are two pairs of blades or contacts *r s* similarly fitted. Each member of the pair *r* is, however, arranged to project farther toward its respective projection or bar *h* or *j*, as seen to the right hand of Fig. 1 and to the left hand of Fig. 4, than members of the pair *s* and, as seen in Fig. 5, the brushes *r* are connected by the wire *t* with the other terminal of the shunt field winding *p*. Members of the pair *s* are connected with the positive main *u* of the system by the connections *v* and *w*.

It will be apparent that when the armature rotates in one direction or the other, the engagement of the brushes *b* with the commutator will cause the rocker *a* to turn through a small angle until the projections or bars *h* and *j* which are in electrical connection with the respective brushes *b*, are arrested, one by a member of the pair *m* connected with the negative main *n* and one terminal of the shunt field winding *p*, and the other by a member of the pair *r* connected with the other terminal of the shunt field winding *p*. The circuit of the shunt field winding *p* is thus at once closed but the main circuit or positive connection *v w u* between the dynamo and the cells *x* remains open as the friction between the brushes *b* and the commutator does not produce sufficient turning movement for overcoming the resistance which the spring contact brushes or blades *m* and *r* offer to further movement of the rocker *a* so that the bar *h*, or the bar *j*, as the case may be, will still not touch the brush *s*. The turning of the rocker *a*, however, brings one of the iron armatures *c* close to the suitably shaped pole or poles *y* of the electro-magnet *d* whose windings *z* are preferably in the circuit of the shunt field winding *p* as seen in Fig. 5. As the speed of the armature increases, the dynamo field builds up in the ordinary way due to increase of current in the shunt winding *p* and the electromagnet *d* increases in power until the speed is reached at which sufficient voltage is generated to allow of safely closing the main switch. At this point the magnet *d* pulls on the armature *c* which has approached the pole *y* as above described and turns the ring *a* a little farther against the resistance offered by the spring contact brushes or blades *m* and *r* which are engaged by the projections or bars *h j* as aforesaid. These contacts or blades *m* and *r* are thus depressed or flexed, thereby permitting one or other of the projections or bars *h* or *j* to make contact with a member of the remaining pair of contacts or blades *s* and to connect the positive brush of the dynamo with the positive main, the current flowing from the positive brush on the left of Figs. 1 and 2, through the holder *k* and the bar *h* through the brush *s* on the left hand and thence through the wires $v$, $w$ and $u$, Fig. 5. In the latter figure and in Fig. 2, the rocker is seen, for convenience, in a mid position but in actual working conditions it is hardly likely that the rocker would ever take up such a position unless springs were applied thereto for the purpose. As long as the speed remains high enough, the magnet $d$ will maintain the parts in this condition, but when the speed diminishes the power of the magnet $d$ will likewise diminish, until a certain speed is reached at which the magnet $d$ will not be sufficiently energized to hold on the armature $c$ against the effort of the spring brushes $m$, $r$, $s$ and the latter pressing upon the bars $h$ and $j$ will slightly turn the rocker, thereby shifting the bar $h$ or $j$ as the case may be out of contact with the brush $s$. Referring to Fig. 1 it will be seen that upon diminution of speed, the bar $h$ would be shifted in this manner out of contact with that brush $s$ which is on the left hand. When this occurs the main circuit is broken and the circuit of the field winding, if it be in shunt will gradually die away until the armature spindle ceases to rotate. If the spindle be then driven in the opposite direction, the rocker will turn through a small angle and first bring the bar $j$, Fig. 1, against the brush $r$ on the right hand and the bar $h$ against the brush $m$ on the left hand. Thus, seeing that the commutator brush $b$ corresponding with the bar $j$, has changed from negative to positive, the brush $r$ will still remain positive and as the commutator brush $b$ corresponding with the bar $h$ has changed from positive to negative, the brush $m$ will still remain negative. Therefore the winding $z$ and shunt field winding will still be electrified in the same direction as before and the magnet $d$ will act in the same manner as above described, only for this direction of rotation the armature $c$ on the right hand is brought near to the magnet pole $y$ by the first movement of the rocker and is attracted by the magnet $d$ for the purpose of completing the main circuit as above described. It is preferable in some cases however, to provide a second automatic main circuit closer suitably in the shape of an electromagnetic main switch the lever armature 1 Fig. 5 of which is primarily attracted by a shunt winding 2 connected across the mains, one terminal of the winding 2 being connected with the switch part 3 to which the positive main $u$ is connected and the other terminal being connected by the connection 4 and wires 5 and 6 with the negative main $n$. The armature lever 1 carries a switch brush 50 which makes contact with the part 3 and closes the main circuit when the winding 2 is sufficiently energized. A series winding 7, wound in the same direction as the winding 2, is connected at one end to the brush 50 and at the other end to a terminal 8 from which the positive main $u$ proceeds to the junction between the positive wire 9 of the battery and the positive wire 10 leading to the terminal 11 on the lighting switch.

As soon as one or other of the brushes $s$ is electrified by the bar $h$ or $j$, thereby electrifying the positive main $u$, current flows through the connection 3, shunt winding 2, connection 4 and wires 5 and 6 to the negative main $n$, and when sufficient electro-motive force is generated by the dynamo this shunt winding 2 pulls on the armature 1, or sucks in a core if a solenoid is used, and causes the brush 50 to contact with the terminal 3, thereby closing the main circuit to the battery $x$ and lighting switch, the flow of current through the series winding 7 causing the magnet to be more strongly energized and to hold on the armature 1 with great firmness.

If desired, the electro-magnet for operating the rocker may be polarized.

The main switch magnet or solenoid comprising the windings 2 and 7 is advantageously inclosed in a casing the lid of which may be fitted with a contact for completing the circuit of this magnet only when the lid is in position, so that the removal of the lid puts the magnet out of action.

To provide for possible loss of the residual field of the dynamo an additional contact 12 may be arranged upon the main lighting switch and this contact may be connected by a wire 13, seen in Fig. 5, with the shunt field winding $p$ by way of the wire $t$, so that, as shown, the wire 13 is connected at a point between the field winding $p$ and the winding $z$ of the rocking switch magnet $d$ which is conveniently included in the circuit of the shunt field winding $p$ as aforesaid. This contact 12 is so arranged as to be engaged by the lighting switch bar or blade, not shown, when the latter is turned to the vertical position in Fig. 5 for putting the lamps or other consuming devices 14 in circuit, whereupon current from the battery $x$ passes by way of wires 9 and 10 and contact 11 not only to the lamps but also by way of contact 12 and wires 13 and $t$ to the shunt field winding $p$, through resistance 25 to terminal $o$, resistance 28, wire $q$, negative $n$ to the battery, thereby energizing the winding $p$ and producing an initial field. A lamp 15 may be inserted in this connection 13 which lamp not only acts as a resistance but also as an indicator. The initial field may be insured however in other ways and an advantageous method is that indicated in Fig. 5, according to which a high resistance 16, such as that provided for example by a volt meter coil, is connected across the terminals of the main switch. Thus when the latter is open a very small current can pass from the battery $x$, through the wire 9, connection 8, series winding 7, resistance 16, terminal contact 3, positive main $u$, wires $w$ and $v$ to the brushes $s$. To insure that the current shall be conducted to the shunt windings $p$ in all conditions of the rocking switch, as for example when the bar $h$ or $j$ is touching only the corresponding brush $r$, or is touching no brush at all, a second high resistance 17 is connected between the brushes $s$ and $r$ so that the current from the battery can continue from the brush $s$ through resistance 17, brush $r$, winding $z$, wire $t$ and shunt windings $p$ back to the negative main. Of course when the dynamo generates a voltage the latter will oppose the electromotive force of the cells and the small current from the battery will disappear as the speed rises.

There may be as stated series turns 18 on the field magnets which, at one end may be connected with the junction between the wires $v$ and $w$ and at the opposite end may be connected by wire 19 with a terminal 20 arranged near a suitable terminal 21 of the wire $w$. When the plug 22 is inserted, as shown, between the terminals 20 and 21, the series turns 18 are short circuited and have no effect but when the plug 22 is removed the working current flows from the brush $s$ to the positive main $u$ by way of wire $v$, series turns 18, wire 19, and terminal 20, instead of by way of wires $v$ and $w$, terminal 21 and plug 22 as before.

When the demagnetizing series turns 18 are effective so that the dynamo becomes self regulating and maintains a constant voltage or output at various speeds as hereinbefore referred to, the brushes $b$ and bars $h$ and $j$ may be allowed a greater amplitude of oscillation by removing from the ends of the bars $h$ $j$ the liners $h'$ and $j'$, Figs. 1 to 4, which are secured by the studs $h^2$ $j^2$. Indeed any desired amplitude of swing or oscillation of the brush rocker may be secured by liners of different thicknesses so that the different conditions may be accurately provided for.

The shunt windings $p$ may be connected to the pair of negative brushes $m$ through a variable resistance as shown in Fig. 5. In this suitable arrangement one terminal of the windings $p$ is connected by a wire 23 with a terminal 24, as through a resistance 25 with the terminal $o$. When the plug 26 is inserted between the terminals $o$ and 24, the resistance 25 is short circuited and when the plug 26 is removed, as shown, the resistance 25 is effectively in circuit with the shunt windings $p$ and consequently the dynamo will require a higher speed in order to generate the critical voltage than is the case when the plug 26 is inserted and the resistance 25 is short circuited. The terminal $o$ is connected with the pair of brushes $m$ by the wire $q$ which may include the resistance 28, and the latter may be normally short circuited as hereinafter described.

In order to protect the battery against overcharging, an electro-magnetic switch may be provided, having its winding 29 connected across the terminals of the battery $x$. This switch may be thus connected, only when the lighting switch is turned off which is the arrangement illustrated in Fig. 5, wherein one terminal of the winding 29 is connected by wire 30, connection 31 and wire 32 to a contact 33 on the lighting switch, a diametrically opposite contact 34 on the lighting switch being connected by wire 35 with the positive main $u$. The opposite terminal of the winding 29 is connected to the negative main $n$ by wire 36, connection 37 and wire 6. When the voltage rises unduly, which is an indication of the completeness of the charge, the magnet winding 29 becomes sufficiently energized for pulling on the armature 38. This action may be utilized, as shown in Fig. 5, for lifting the switch brush 39 from the contact 40 and this opening of the switch may be arranged to break the connection between the dynamo and the battery, or to insert the resistance 28 in the circuit of the shunt field winding $p$ and so reduce the strength of the field. The latter arrangement is illustrated by the drawings, the insertion of the resistance 28 being accomplished by connecting the terminals $o$ and 40 by a wire 41 and by connecting the brush 39 with the connection 37 by the flexible wire 42. Normally, therefore, when the brush 39 rests on the contact 40, the resistance 28 is short circuited by the wire 41, connection 40, brush 39, flexible wire 42, connection 37, wire 6, and negative main $n$ which is connected to the negative pair of switch brushes $m$. As soon as the voltage is sufficiently raised, due to the completion of the charging of the battery, and the armature 38 and brush 39 are lifted as aforesaid, this short circuit connection is broken and the resistance 28 becomes effective in the circuit of the shunt winding $p$ and reduces the strength of the field to the desired extent. It will be readily understood that this overcharge-preventing magnet operates only when the lamps 14 or other consuming devices are not in use, that is to say, when the switch bar connects across from the contact 33 to the contact 34 in what would otherwise be the "off" position.

The system may be of the single battery type as shown in Fig. 5, or of the double battery type as shown in Fig. 6, and in the latter case a suitable mechanical or electromagnetic device is provided for changing over the batteries $x$ and $x'$ in known manner, either each time that the direction of rotation of the armature is changed, or each time that the dynamo is connected up to the batteries $x$ $x'$ or disconnected therefrom. In place of such a change-over switch, the pair of blades $s$ hereinbefore described, which stand off from their contacts on the rocker until a sufficient voltage has been generated, may be employed to accomplish the change-over each time that the direction of running is reversed. To this end the blade members $s$, $s'$, of this pair, instead of being directly connected together or made in one, are separated as by insulation 61, Fig. 6, and are connected through a lamp resistance 62. One battery $x$ is connected with one blade member $s$ and the second battery $x'$ with the other blade member $s'$ as shown. In this way it is arranged that when the dynamo runs in one direction, one battery, for example the battery $x$, Fig. 6, is charged directly by the dynamo, whereas the other battery $x'$ Fig. 6, may only receive current occasionally through the resistance 62 by way of brush $s$, wire 9, resistance 62, and wire $9^a$. When the dynamo runs in the other direction the connections of the batteries are interchanged with the well known result. In order that the current from the dynamo to the lamps 14 must always pass through the lamp resistance 62, a fixed pair of brushes $s^2$ is arranged in relation to the brushes $s$ $s'$ and is connected with the lamp switch 141 as shown. Consequently when the bar $j$ is pressed against the brush $s$, as shown, so as to flex the latter, the corresponding brush $s^2$ has its contact with the brush $s$ broken so that current can only pass to the lamps 14 from the bar $j$ by way of brush $s$, wire 9, resistance 62, wire $9^a$, brush $s'$, brush $s^2$, wire 140 and switch 141. The path of the current, when the bar $h$ flexes the brush $s'$ will be readily understood.

In some cases the electromagnetically operated main switch may be dispensed with and the electromagnet $d$, which operates the rocker in the manner aforesaid, may be relied upon to close the main circuit through the brush $s$ when the speed, and therefore the voltage, is sufficient to permit of the dynamo being connected up to the main working circuit with safety. With this arrangement the rocker is operated by the magnet $d$ to bring the bars $h$ or $j$ into contact with one or other of the brushes $s$ at the proper voltage and the circuit is held closed so long as current is delivered by the armature. As the speed is reduced, the voltage at the dynamo terminals is correspondingly decreased until it falls to the voltage of the accumulator; at this moment the armature ceases to have an output and if the magnet $d$ does not readily deënergize or, if the magnet armature sticks, a current may flow back from the batteries to the dynamo which will at once allow or cause the armature $c$ to fly off and the rocker to return to the position in which the connection of the dynamo with the working and battery circuits is broken.

In the modification of the last named arrangement, the magnet $d$ has some series turns wound upon it, so that, as shown in Fig. 7, the working current proceeding from either of the brushes $s$ first passes around the series turns before flowing to the working circuits. Moreover a third pair of brushes 63 is provided and so arranged that one or other of its members is engaged by the bar $h$ or the bar $j$, as the case may be, after the brushes $r$ $s$ have been successively engaged thereby. This double brush 63 is connected by wire 64 with a point in the shunt winding $z$ of the magnet $d$. The action therefore, is as follows: Upon the armature revolving in one direction or the other the rocker moves in a similar direction and brings the bar $h$, or the bar $j$, first against one of the brushes $r$ thereby completing the circuit of the shunt winding $p$ and magnet winding $z$. As the speed increases the magnet $d$ becomes more powerful and, when the armature speed and the strength of the field magnetism are such as to insure the required output, the bar $h$ or $j$ is moved a little farther by the action of the magnet $d$ on the rocker so as to touch one of the brushes $s$ and complete the main circuit. Supposing that any appreciable flow of current to the working circuit then takes place, the series turns on the magnet $d$ will more strongly energize the latter and the rocker will thus be turned a little farther by the magnet $d$ thereby bringing the bar $h$ or $j$ into contact with one of the brushes 63 which will result in short circuiting the winding $z$ up to the point at which the wire 64 is connected. Or, of course, the winding $z$ may be entirely short circuited. The magnet $d$ in spite of the short circuiting of the winding $z$, is still powerful enough to hold the rocker in the position in which all of the three brushes $r$ $s$ and 63 touch the bar $h$ or $j$. The complete or partial short-circuiting of the magnet winding $z$ effects a reduction in the resistance of the circuit of the shunt winding $p$, thereby avoiding or counteracting the drop in voltage which otherwise takes place when a shunt wound dynamo, working on open circuit, is closed on to a working circuit.

I claim:

1. In a reversible dynamo, an automatic switch gear comprising, a rocking support, switch parts thereon, contacts supported in the paths of said switch parts, a part revolving with the dynamo armature and adapted to move said switch parts against certain of said contacts, friction engaging means between said support and revolving part, and electromagnetic means operative upon said rocking support in unison with said frictional engaging means and adapted to give said support an additional movement for effecting the closing of a circuit.

2. In a reversible dynamo, an automatic switch gearing comprising, a rocking support commutator brush holders on said support, brushes in said holders, switch parts on said support, contacts mounted in the paths of respective switch parts, and electromagnetic means operative upon said support in the same direction as said support is operated by the engagement of the brushes with the commutator.

3. In a reversible dynamo, an automatic switch gear comprising, a brush rocker, switch parts thereon connected with respective brushes, coöperative switch contacts in the paths of said switch parts in different relative positions so that certain of said parts and contacts come into engagement upon the initial rocking of said brush rocker in either direction, and electromagnetic means operative upon said rocker to bring about the complete engagement of switch parts and contacts.

4. In a reversible dynamo, a rocking brush holder, reversing switch parts carried thereon and connected with respective brushes, switch brushes variably arranged in the paths of said switch parts and electromagnetic means operative upon said holder in the same direction as said holder is turned by the engagement of its brushes with the commutator in either direction of running, and circuits successively closed by said switch parts and brushes.

5. In a reversible dynamo, a rocking reversing switch arranged to rock in one direction or the other according to the direction of running, flexible switch brushes variably arranged so that certain of them contact as soon as the switch is rocked by the revolution of the armature, and electromagnetic means operative upon said rocking switch in either direction of running, a circuit closed by the brushes making the first contact, the windings of said electromagnetic means being in said circuit.

6. In a reversible dynamo, a brush rocker, contacts fixed thereon at about diametrically opposite points and in electrical connection with respective collecting brushes, positive and negative terminal switch brushes fixed to the framing of said dynamo and extending into the paths of said contacts in such manner that each brush will engage a different contact when the direction of running is reversed, a main circuit, a second positive brush constituting a terminal of said circuit, and having its contacting ends in the paths of said contacts and in the rear of the contacting ends of the first positive brush, a shunt circuit, and electro-magnetic means operative upon said brush rocker, the windings of said means being in the shunt circuit, which is closed by the engagement of said contacts with the first named brushes.

7. In a reversible dynamo, a brush rocker frame, commutator brushes thereon, arms carried on said frame and insulated therefrom, contact devices fixed on said arms and in electrical connection with respective brushes, spaced armature devices on said frame, an electromagnet fixed to the dynamo framing, a pole of said magnet lying between said armatures, a negative brush and a positive brush each comprising two arms which extend into the paths of respective contact devices, the positive brush being oppositely arranged to the negative brush, a shunt circuit, the terminals of which are constituted by said brushes, a main circuit, and a second positive brush constituting a terminal of the main circuit, said second positive brush being arranged similarly to the first positive brush but having its extremities in arrear of those of the first positive brush.

8. In a reversible shunt wound dynamo, a brush rocker frame, commutator brushes thereon, switch-contacts on said frame insulated therefrom and in electrical connection with respective commutator brushes, a switch brush fixed on said dynamo and having arms extending within the arcual paths of said contacts, said brush constituting a positive terminal of the shunt field winding, an electro-magnet operative upon said rocker frame in the same sense as said frame is influenced by the engagement of its brushes with the commutator in either direction of running the windings of said magnet being in the circuit of the shunt field winding, a second switch brush fixed on said dynamo and having arms extending within the arcual paths of said contacts said brush being oppositively disposed to the first switch and constituting a negative terminal of both the shunt field winding and of the working circuit, and a third switch brush arranged alongside the first switch brush and having arms shorter than those of the first switch brush extending within the arcual paths of said contacts said third switch brush constituting the positive terminal of the working circuit.

9. In a reversible dynamo, an automatic switch gear comprising a rocking support, commutator brush holders on the support, brushes in the holders, switch parts on said support, interchangeable contacts mounted on the switch parts, coöperative contacts mounted in the paths of respective switch parts, and electromagnetic means operative upon said support in the same direction as the support is operated by the engagement of the brushes with the commutator.

10. In a reversible dynamo, a brush rocker frame, commutator brushes thereon, insulated switch contacts on said frame and in electrical connection with respective commutator brushes, liners removably arranged on said switch contacts, a switch brush fixed on said dynamo and having arms extending within the arcual paths of said contacts, said brush constituting a positive terminal of the shunt field winding, an electro-magnet operative upon said rocker frame in the same sense as said frame is influenced by the engagement of its brushes with the commutator in either direction of running the windings of said magnet being in the circuit of the shunt field winding, a working circuit, a second switch brush fixed on said dynamo and having arms extending within the arcual paths of said contacts, said brush being oppositely disposed to the first switch brush and constituting a negative terminal of both the shunt field winding and of the working circuit, and a third switch brush arranged alongside the first switch brush and having arms shorter than those of the first switch brush extending within the arcual paths of said contacts, said third switch brush constituting the positive terminal of the working circuit.

11. In a reversible dynamo, a rocking reversing switch comprising two oscillatory contacts connected with respective commutator brushes, electromagnetic means operative upon said rocking switch in unison with the influence of the frictional engagement of the brushes with the commutator in either direction of running, a double switch brush arranged on one side of the commutator and having its ends in the paths of respective contacts and constituting a terminal of the shunt field winding circuit in which is included said electromagnetic means, a second double switch brush having its ends in the paths of respective contacts but arranged on the opposite side of the commutator constituting a negative terminal of the shunt circuit and of the working circuit, a pair of switch brushes insulated from one another and placed alongside the first switch brush each member of said pair of brushes adapted to be connected with the positive pole of a respective accumulator battery, and a double switch brush constituting a positive terminal of the consuming circuit and adapted to make contact with both members of said pair of brushes in the stationary condition of the dynamo, one member of said pair being moved away from the last named double brush upon the attainment of a predetermined speed, substantially as set forth.

12. In a reversible dynamo, a rocking reversing switch comprising two oscillatory contacts connected with respective commutator brushes, electro-magnetic means operative upon said rocking switch in unison with the influence of the frictional engagement of the brushes with the commutator in either direction of running, a double switch brush arranged on one side of the commutator and having its ends in the paths of respective contacts and constituting a terminal of the shunt field winding circuit in which is included said electromagnetic means, a working circuit, a second double switch brush having its ends in the paths of respective contacts, but arranged on the opposite side of the commutator constituting a negative terminal of the shunt circuit and of the working circuit, a pair of switch brushes insulated from one another and placed alongside the first switch brush each member of said pair of brushes adapted to be connected with the positive pole of a respective accumulator battery, a consuming circuit, and a double switch brush constituting a positive terminal of the consuming circuit and adapted to make contact with both members of said pair of brushes in the stationary condition of the dynamo, one member of said pair being moved away from the last named double brush upon the attainment of a predetermined speed.

13. In apparatus of the class described, a switch gear comprising in combination, contacts, switch parts therefor, means having frictional engagement with a rotating part of the dynamo for moving said switch parts in a direction corresponding to the direction of the rotation of said rotating part, and a second means for imparting additional corresponding movement to effect the closing of a circuit.

14. In apparatus of the class described, a switch gear comprising in combination, contacts, switch parts therefor, means operated by a rotating part of the dynamo for moving said switch parts in a direction the same as the direction of movement of said rotating part, and a second means for imparting additional corresponding movement to effect the closing of a circuit.

15. In apparatus of the class described, a switch gear comprising in combination, contacts, switch parts therefor, means operated by a rotating part of the dynamo for moving said switch parts in a direction the same as the direction of movement of said rotating part, and a second means for positively imparting additional corresponding movement to effect the closing of a circuit.

16. In a reversing dynamo, an automatic switch gear operable from a rotating part of the dynamo in either direction of running and carrying two sets of switch parts for closing two circuits, one set being in advance of the other and relatively movable with respect thereto whereby the circuits may be successively closed.

17. In a reversing dynamo, an automatic switch gear operable from a rotating part of the dynamo in either direction of running and carrying two sets of switch parts for closing two circuits, one set being yieldingly in advance of the other whereby the circuits may be successively closed.

18. In apparatus of the class described, a switch gear comprising a rocking support carrying switch parts and provided with a pair of spaced armatures, means for imparting an initial movement to the rocking support in either direction of running, and an electro-magnet intermediate the armatures for imparting an additional corresponding movement to said support.

19. In apparatus of the class described, a reversing switch gear comprising a rocking support carrying switch parts and provided with a pair of spaced armatures, a circuit, means for imparting an initial movement to the rocking support in either direction of running to close said circuit, and an electro-magnet in said circuit and located intermediate said armatures for imparting an additional corresponding movement to said support.

20. In a reversing dynamo, an automatic reversing switch gear comprising a rocking support, means for rocking said support from a rotating part of the dynamo in either direction of running, said support being provided with a pair of opposed armatures and carrying switch parts, a circuit closed by switch parts on said support upon rotation of the dynamos, and an electro-magnet in said circuit located intermediate said armatures for imparting an additional movement to said support upon the closing of said circuit.

21. In apparatus of the character described, a dynamo, a switch gear operable from a rotating part of the dynamo and carrying two sets of switch parts for closing two circuits, one set being in advance of the other and relatively movable with respect thereto whereby the circuits may be successively closed.

In testimony whereof I have hereunto signed my name and affixed my seal.

ALFRED HENRY DARKER. [L. S.]